Dec. 21, 1965 W. SPIELVOGEL 3,224,358
APPARATUS FOR RECOVERING FERMENTABLE LIQUORS
Filed Nov. 22, 1961 3 Sheets-Sheet 1

WALTER SPIELVOGEL
INVENTOR.

BY

AGENT

WALTER SPIELVOGEL
INVENTOR.

BY

AGENT

WALTER SPIELVOGEL
INVENTOR.

United States Patent Office 3,224,358
Patented Dec. 21, 1965

3,224,358
APPARATUS FOR RECOVERING
FERMENTABLE LIQUORS
Walter Spielvogel, Essen, Germany, assignor to Weigelwerk G.m.b.H., Essen, Germany, a corporation of Germany
Filed Nov. 22, 1961, Ser. No. 154,146
Claims priority, application Germany, Nov. 23, 1960, W 28,981
8 Claims. (Cl. 99—278)

My present invention relates to an apparatus for recovering fermentable liquors from a pulp-like mass, in particular for extracting the wort used in brewing beer from the mash and/or for processing the wort-hops infusion.

Conventionally the wort is obtained from mash by means of refining vats or mash filters. These are vessels that have a perforated or sieve bottom. The solids in the mash descend to the bottom of the vessel and serve as the filter medium for the wort. After the first concentrated wort has been drawn off, sparging water is added to the top of the mash to leach it and remove the remaining sugar. This process takes a long time, requires a great deal of space in the brewery, and cannot be accelerated or otherwise controlled; moreover, it is strictly a batch process.

It is an object of my invention to provide a continuous and conveniently controllable filtering process for the brewing industry whereby, irrespectively of the quantity involved, less floor space will be required than heretofore, as well as an improved apparatus for carrying out the process.

It is a further object of my invention to provide an apparatus that not only can be employed to extract wort from the mash but also can serve as a kettle for cooking the hops and concentrating the wort.

In accordance with a feature of this invention I provide a preferably vertical or nearly vertical duct through which the pulpy mass to be processed is continuously fed in a continuous motion; the liquor to be extracted from the mass is withdrawn laterally from the duct at one location while a fresh supply of flushing liquid designed to replace the recovered juices is continuously admitted laterally into the duct at another location. The duct may be divided into a plurality of sections disposed in cascade for consecutive traversal by the mass, each section being provided with at least one external port serving as a fluid inlet or outlet. In particular, the several sections may be constituted by units with perforated inner walls and solid outer walls, the latter walls carrying the inlet and outlet parts for the fluids. Suitable conduits may be provided between these ports for letting the same fluid pass successively through the several sections, under gravity, pressure and/or forced circulation, to cause progressive enrichment of the fluid by extracts from the treated mass.

In its preferred application to beer production, the system of my invention can be utilized in the pre-fermentation stage of a brewing plant for the recovery of the wort from the malt and/or for the conversion of simple wort into hopped wort. Thus, the fluid to be admitted into the duct at the aforementioned inlets will be water or diluted wort in the first case and relatively concentrated wort in the second case, the charge of the duct being malted mash in one instance and expanding hops in the other. If desired, the processed charge or a part thereof may be recirculated through the duct for more complete extraction of its juices. Elevated temperatures may be maintained in the duct by suitable heating means to promote the process, e.g. in the production of hopped wort.

The above and other objects, features and advantages of my invention will become more readily apparent from the following description, reference being made to the accompanying drawing in which.

Figure 1:
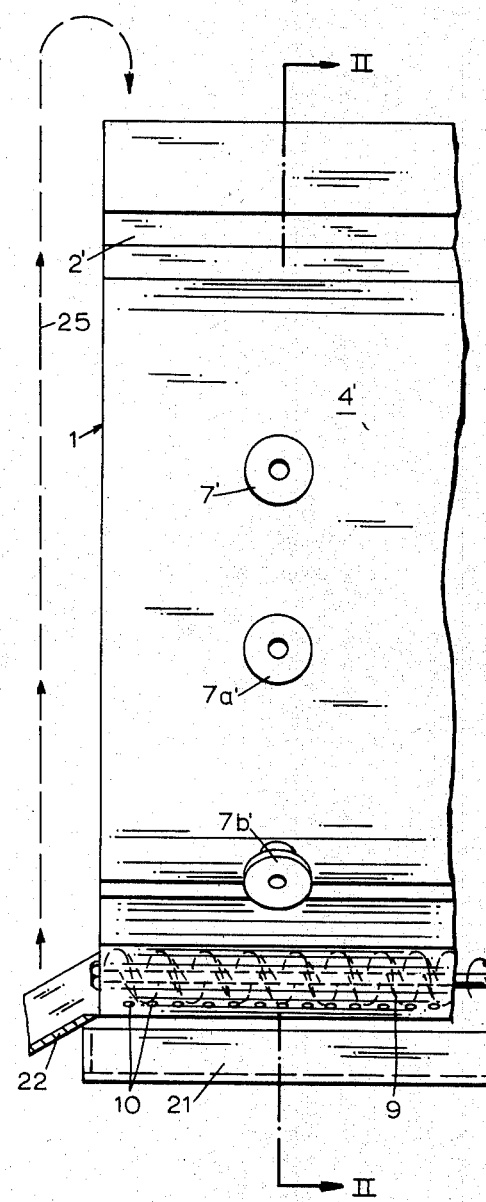
FIG. 1 is a partial front view of an apparatus for extracting wort from malt.
Figure 2:
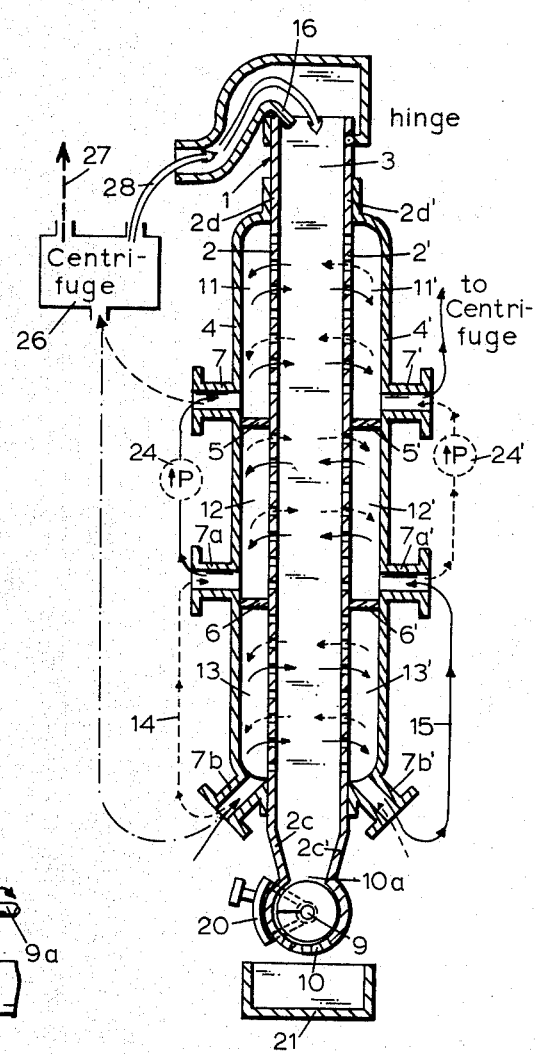
FIG. 2 is a longitudinal cross-sectional view taken on the line II—II of FIG. 1.

In FIGS. 1 and 2 a vertical duct 1 is defined by two opposite perforated side walls 2, 2' and end walls 3 (only one shown). The perforated region of each sidewall is shielded by a respective outer wall 4 and 4' forming therewith a series of filter chambers 11, 11', 12, 12', 13 and 13' which are separated from one another by horizontal partitions 5, 5' and 6, 6'. Each of these chambers is provided with a port 7, 7a, 7b and 7', 7a', 7b'. The area of the inner walls 2 and 2' enclosed by imperforate outer walls 4 and 4' constitutes the working surface of the duct and will be selected to suit specific requirements. It may be assumed by way of illustration that the thickness of the mash cake between the filter walls 2 and 2' is between 15 and 40 cm.

A long screw 9 with shaft 9a is received in a horizontal cylindrical housing 10 which is disposed below the duct 1 and communicates through a slot 10a with the lower end thereof formed by the converging bottom portions 2c, 2c' of the side walls. The housing 10 has perforations which can be covered by a slide 20. Liquor discharged through these perforations is caught in a pan 21 while the solids expelled by screw 9, which is driven by a suitable motor not shown, are delivered to their destination (e.g. a drying chamber) via a chute 22.

When the apparatus of FIGS. 1 and 2 is to be used for the extraction of wort from malt, the mash consisting of meal and liquid is introduced into the top of the duct 1 from a chute or a closed piping system by its inlet 16 and fills the duct uniformly. Since the inner walls 2, 2' between which the mash is retained are sieves, the mother liquor and the subsequent worts of progressively greater dilution flow freely from the mash into the chambers 11-13 and 11'-13'. The ports 7, 7a, 7b and 7', 7a', 7b' of these chambers can be interconnected in the sequence shown by the dotted arrows 14 or the one indicated by the solid arrows 15, and sparging water can be forced upwardly through the mash cake by means of pumps 24, 24' to extract more diluted wort from the batch. This sparging under pressure provides a controllable and more rapid rate of extraction of wort than leaching by gravity. The flow, which alternates in direction between duct sections surrounded by adjacent chamber pairs, can be selectively directed through all chambers, or through only some of them, in upward or downward succession with the aid of valves not shown. Wort can be drawn off at any port and can be either returned to a different part of the mash or delivered directly to the brewing vessel.

The top portions 2d, 2d' of the duct-forming walls 2, 2' are unperforated. The height of this unperforated section should be small enough so that the mass contained therein compacts only lightly the mash between the upper chambers 11 and 11', preferably to such an extent that the pressure required by the sparging water at the top of the duct is only about one-tenth that needed to penetrate the mash between lower chambers 13 and 13'. If necessary, the ascent of the sparging water along the duct 1 can be assisted by booster pumps 24, 24′ between successive levels; while only two such pumps have been shown, they may be used at any point in the circuit to establish a desired head. Progressively sparging the mash from bottom to top permits the sugar to be extracted therefrom with exactitude and a wort of the desired concentration to be produced. Since the sparging process can be begun at any of the ports on the duct 1 it is possible selectively to leach certain portions of the column of material to be processed and to allow spent portions of the column to rest while further enzyme action takes place.

The width of the duct 1 is the dimension seen in FIG. 1 may be selected at will to handle the needs of a particular brewery; it is, of course, also possible to dispose a plurality of such ducts alongside one another and to have them served by a common discharge screw 9. The output of that screw may, moreover, be recirculated to the inlet of the same or some other duct for further processing of the only partial spent malt or in order to form a starting charge at the beginning of a new operating cycle; this has been indicated schematically at 25 in FIG. 1.

The wort recovered at, for example, the uppermost port 7 or 7′ (as well as that collected in pan 21) may, if desired, be recirculated via inlet 16 for further enrichment and/or clarification. For the latter purpose the wort, if still cloudy, can also be passed through a centrifuge 26 from which the clear liquor is led off at 27 whereas the separated albuminous solids are returned to the apparatus at 28.

Figure 3:
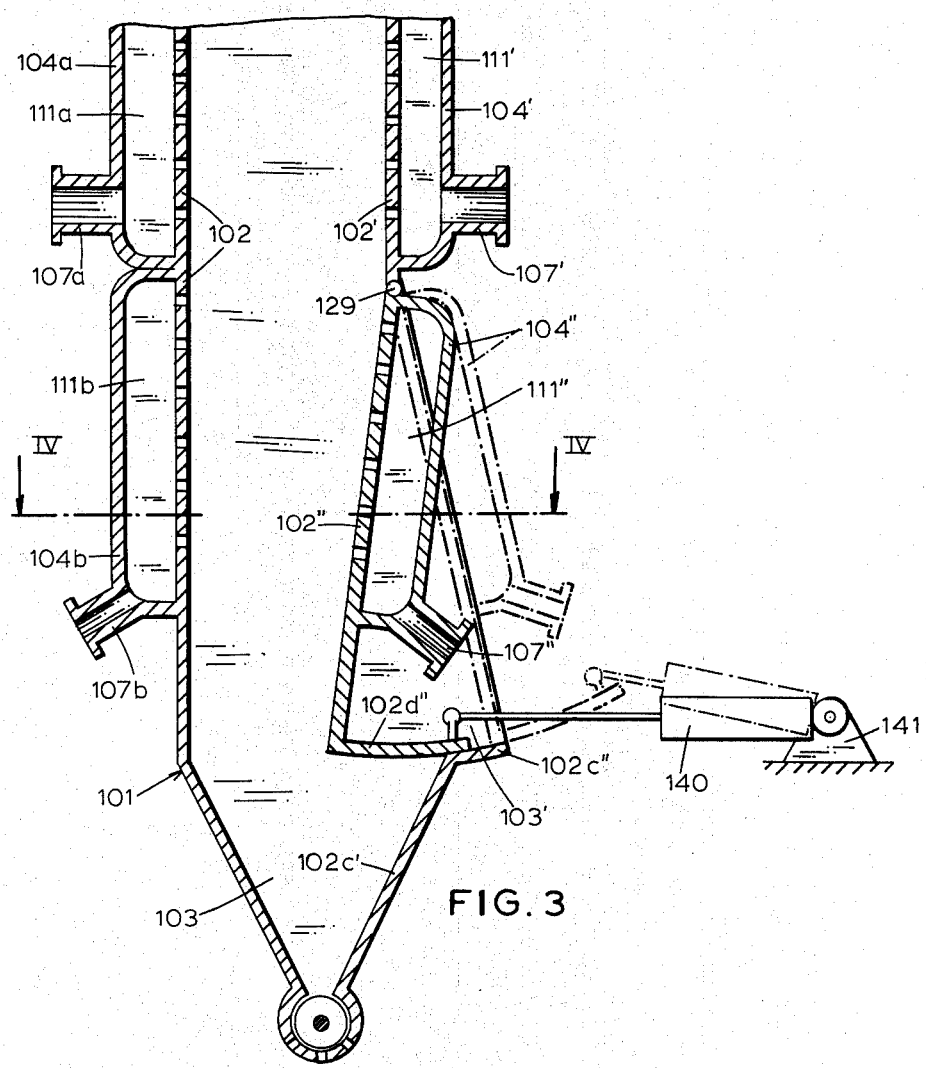
FIG. 3 is a sectional view similar to FIG. 2, showing a modification.
Figure 4:
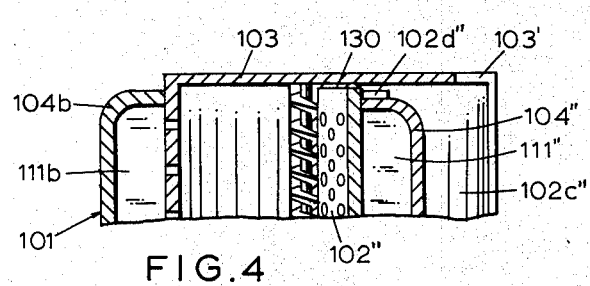
FIG. 4 is a cross-sectional view taken on the line IV—IV of FIG. 3.

In many instances it is desirable to change the width of the duct during processing, either for the purpose of expediting the descent of the column therein or in order to squeeze the mash so as to facilitate the extraction of residual juices therefrom; to this end it is proposed, in accordance with a further feature of my invention, to make either or each of the perforated side walls thereof displaceable in whole or in part, especially in its lowermost portion; such an arrangement also facilitates the cleaning of the apparatus. This has been illustrated in FIGS. 3 and 4 where the duct 101, which is otherwise similar to the one shown in the preceding figures, is formed with a stationary side wall 102 and an opposite side wall including a fixed portion 102′ and a swingable portion 102″. The corresponding outer shields, forming chambers 111a, 111b and 111′, 111″ are shown at 104a, 104b, 104′, 104″ and are provided with ports 107a, 107b, 107′, 107″. End wall 103 as well as its opposite companion wall, not shown, is suitably extended at 103′ while the lower wall portion 102c′ is provided with an arcuate shoulder at 102c″ to maintain the continuity of the duct when the wall portion 102″ is swung out as indicated in dot-dash lines, this portion further having a curved apron 102d″ centered on the pivotal axis 129 thereof and overlying the shoulder 102c″ to avoid a gap in the inwardly swung position illustrated in solid lines. Suitable packing means 130, e.g. in the form of inflatable gaskets, may be provided between adjacent surfaces of all relatively displaceable elements to insure tightness. The mechanism for positioning the wall portion 102″ has been illustrated somewhat schematically as a hydraulic jack 140 articulated to the apron 102d″ and to a fixed support 141.

Figure 5:
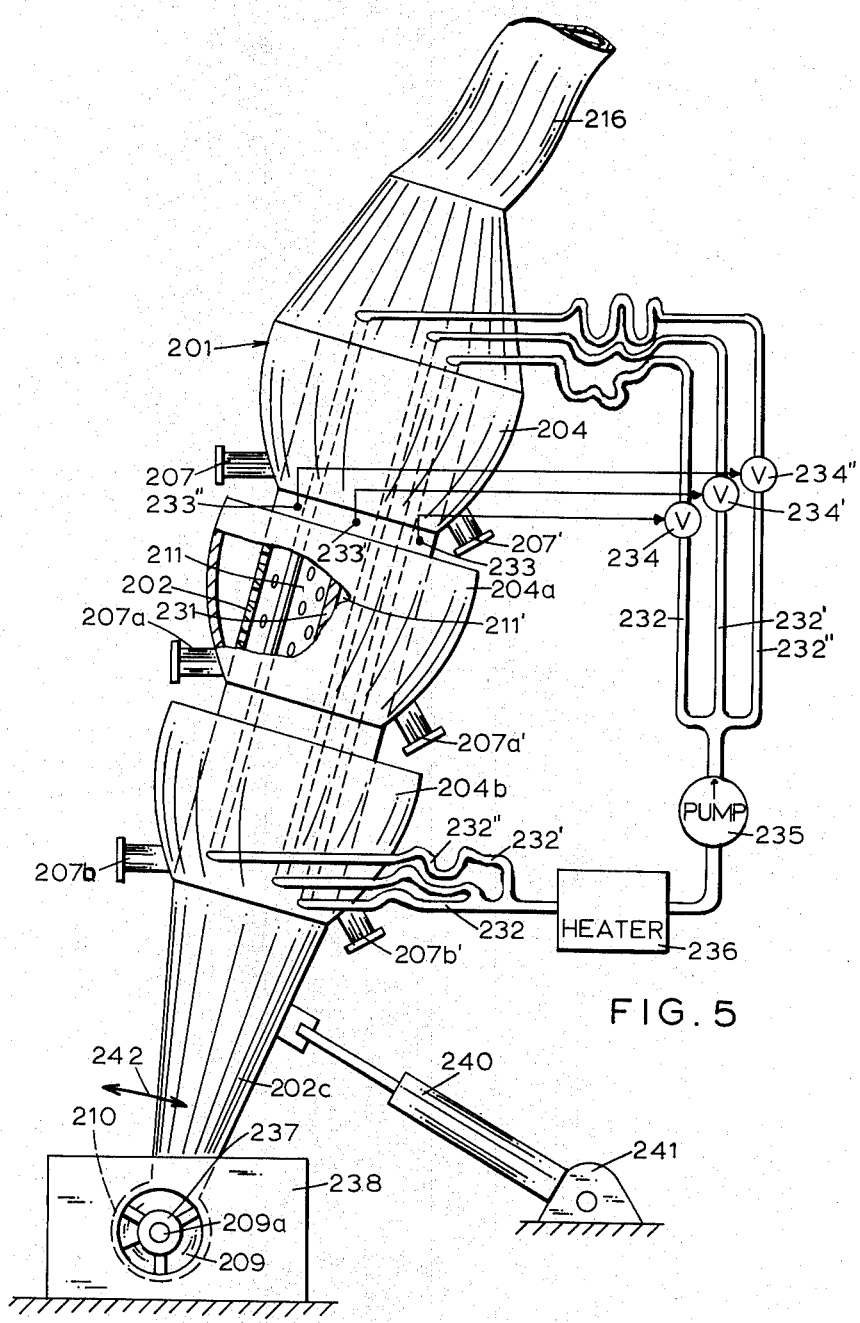
FIG. 5 is a side-elevational view (parts broken away) of another embodiment of the invention, shown in somewhat diagrammatic form.

In FIG. 5 I have illustrated a modified duct 201 of generally cylindrical configuration. The perforated zones of the inner wall 202 are encased in outer shells 204, 204a, 204b which converge generally conically at their lower edges and define filter chambers 211, 211′ separated from each other by axially extending partitions 231 (only one shown). The several chambers are again provided with ports 207, 207a, 207b, and 207′, 207a′, 207b′ serving alternately as inlets and outlets for the circulating fluid. The latter may, in this case, be the wort recovered from an earlier stage, e.g. a duct as shown in the preceding figures, while the charge of the duct 202 may consist of hops to be cooked and expanded in the wort. For this purpose I have shown the duct 201 equipped with heating means illustrated schematically as a set of conduits 232, 232′, 232″ for the circulation of a heating fluid (e.g. steam) through the charge, in combination with thermosensitive feelers 233, 233′, 233″ extending at at various locations into the duct to control the temperature therein by adjusting respective valves 234, 234′, 234″ in the associated conduits. The heating fluid is circulated by a pump 235 and maintained at the proper temperature level by a heater 236.

Another feature of my invention resides in the provision of means for selectively tilting a duct as herein disclosed, either during initial charging or during processing, to control the rate of descent of the column of material to be treated. This feature, while of course applicable to the ducts 1 and 101 of FIGS. 1–4, has been particularly illustrated in FIG. 5 where the shaft 209a of screw 209 is shown journaled in bearings 237 supported by a stationary bracket 238; the front wall of this bracket has an aperture coextensive with screw housing 210 through which the processed solids, after descending through the generally frustoconical lower duct portion 202c, can be discharged. The screw housing may again be perforated, if desired, as described in connection with FIGS. 1 and 2. A hydraulic jack 240, articulated to duct portion 202c and to a fixed support 241, serves to control the positioning of the duct as indicated by arrow 242; it will be understood that the charge inlet 216 and the other connections to the apparatus are to be sufficiently flexible to permit the pivotal movement of the system about the axis of shaft 209a.

My invention is, of course, not limited to the specific constructions or modes of operation described and illustrated; in particular, combinations of compatible features shown in different embodiments are among the many modifications which will be readily apparent to persons skilled in the art and are intended to be embraced in the spirit and scope of the invention as defined in the appended claims.

I claim:

1. An apparatus for extracting liquor from a pulpy mass, comprising wall means forming a generally upright duct, said wall means including a plurality of vertically spaced perforated portions located in pairs on opposite sides of said duct, respective fluid-inlet means for a flushing liquid at one of said perforated portions of each of said pairs, respective fluid-outlet means for the recovery of said flushing liquid together with the extracted liquor at the other of said perforated portions of each of said pairs, feed means at an upper end of said duct for admitting said mass into same, continuously operative discharge means for the spent mass at the lower end of said duct, and conduit means for connecting a lower one of said outlet means with an upper one of said inlet means thereby passing said liquid iteratively through said mass.

2. An apparatus for extracting liquor from a pulpy mass, comprising wall means forming a generally upright duct, said wall means including a plurality of vertically spaced perforated portions located in pairs on opposite sides of said duct, respective fluid-inlet means for a flushing liquid at one of said perforated portions of each of said pairs, respective fluid-outlet means for the recovery of said flushing liquid together with the extracted liquor at the other of said perforated portions of each of said pairs, feed means at an upper end of said duct for admitting said mass into same, continuously operative discharge means for the spent mass at the lower end of said duct, and conduit means for connecting a lower one of said outlet means with an upper one of said inlet means thereby passing said liquid iteratively through said mass, at least part of said wall means being movable, further comprising mechanism for selectively displacing said movable part in a manner varying the width of said duct.

3. An apparatus according to claim 2 wherein said movable part is positioned adjacent said discharge means.

4. An apparatus according to claim 2 wherein said discharge means comprises a feed screw.

5. An apparatus according to claim 1, further comprising charge-heating means in said duct and temperature-control means in said duct coupled to said charge-heating means.

6. An apparatus according to claim 2 wherein said fluid-inlet means and said fluid-outlet means comprise imperforate shield means covering said perforated portions and forming respective filter chambers therewith, each of said chambers being provided with an external port for the passage of liquid between the interior of the chamber and an external circulation system.

7. An apparatus according to claim 1, further comprising mechanism for selectively tilting said duct from a vertical position.

8. An apparatus according to claim 2 wherein said discharge means comprises a substantially horizontal feed screw and a perforated housing surrounding said feed screw, said housing communicating with the lower end of said duct.

References Cited by the Examiner

UNITED STATES PATENTS

| | | | |
|---|---|---|---|
| 2,146,692 | 2/1939 | Tiedman | 203—318 |
| 2,553,387 | 5/1951 | Slama | 210—251 |
| 2,663,623 | 12/1953 | Anderson | 23—270 |
| 2,686,192 | 8/1954 | Bonotto. | |
| 2,847,309 | 8/1958 | Robrbeck | 99—52 |
| 2,921,842 | 1/1960 | List | 23—310 |
| 2,936,236 | 5/1960 | Schwaiger et al. | 99—52 |
| 3,005,398 | 10/1962 | Sandler | 23—270 X |

FOREIGN PATENTS

| | | |
|---|---|---|
| 1,132,602 | 11/1956 | France. |
| 783,644 | 9/1957 | Great Britain. |

WALTER A. SCHEEL, *Primary Examiner.*

TOBIAS E. LEVOW, NORTON ANSHER, GEORGE A. NINAS, JR., ROBERT E. PULFREY, *Examiners.*